United States Patent [19]

Cullen

[11] Patent Number: 4,502,378

[45] Date of Patent: Mar. 5, 1985

[54] HYDRAULIC RESERVOIR FOR SILAGE COMPRESSION MACHINES

[75] Inventor: Steven R. Cullen, Astoria, Oreg.

[73] Assignee: Ag-Bag Corporation, Astoria, Oreg.

[21] Appl. No.: 531,085

[22] Filed: Sep. 12, 1983

[51] Int. Cl.³ .......................... A01F 25/16; B65G 3/04
[52] U.S. Cl. ........................................ 100/65; 100/92
[58] Field of Search ................ 100/92, 93 R, 65, 100, 100/114; 165/41, 47 R, 128

[56] References Cited

U.S. PATENT DOCUMENTS

| | | | |
|---|---|---|---|
| 3,996,999 | 12/1976 | Termont et al. | 165/41 |
| 4,256,031 | 3/1981 | Ryan | 100/65 |
| 4,304,314 | 12/1981 | Sakaguchi et al. | 165/41 X |

Primary Examiner—Peter Feldman
Attorney, Agent, or Firm—Michael A. O'Neil

[57] ABSTRACT

A silage compression machine includes a primary shaft which rotates a plurality of teeth to force material through a passageway into a tunnel. The tunnel includes an arcuate wall extending upwardly and rearwardly from a main beam to a top wall. A hydraulic fluid reservoir is supported on the main beam and includes a rear wall extending adjacent to the arcuate wall of the tunnel. Spacers maintain a predetermined gap between the rear wall of the reservoir and the arcuate wall of the tunnel.

1 Claim, 2 Drawing Figures

4,502,378

HYDRAULIC RESERVOIR FOR SILAGE COMPRESSION MACHINES

TECHNICAL FIELD

This invention relates to an improved hydraulic fluid reservoir construction which is particularly adapted for use in conjunction with silage compression machines.

BACKGROUND AND SUMMARY OF THE INVENTION

The advantageous results that are derived from the storage of fodder and other farm products in agricultural storage bags are now well documented. For example, agricultural storage bags having diameters of up to 12' or more and having lengths of up to 120' or more are now in common usage throughout the United States and numerous foreign countries. Apparatus for filling agricultural storage bags with compressed fodder or other materials is shown and described in U.S. Pat. No. 4,337,805 granted to Ag-Bag Corporation on July 6, 1982, the disclosure of which is incorporated herein by reference.

The silage compression machine shown in U.S. Pat. No. 4,337,805 includes a hydraulic motor which is actuated by pressurized hydraulic fluid supplied from a hydraulic pump. The hydraulic pump may be driven by the power take-off of a conventional farm tractor. Such an apparatus requires the use of a hydraulic fluid reservoir for receiving spent hydraulic fluid from the motor and for supplying hydraulic fluid to the pump. U.S. Pat. No. 4,256,031 granted to Blair Manufacturing Company on Mar. 17, 1981, discloses a hydraulic fluid reservoir construction for silage compression machines wherein the reservoir comprises part of the tunnel which directs compressed material into an agricultural storage bag. According to the disclosure of U.S. Pat. No. 4,256,031, heat from the hydraulic fluid in the reservoir is transferred through the tunnel wall and into the material which is being compressed into the agricultural storage bag.

In actual practice, it has been found that the hydraulic fluid reservoir construction disclosed in U.S. Pat. No. 4,256,031 incorporates numerous disadvantageous characteristics. First, although many silage compression machines require the use of a hydraulic fluid reservoir, such is not always the case. For example, some silage compression machines are driven directly from the power take-off of a farm tractor, while other silage compression machines incorporate an engine, thereby completely eliminating the use of a separate prime motor. When the hydraulic fluid reservoir construction disclosed in U.S. Pat. No. 4,256,031 is used for silage compression machines requiring a hydraulic fluid reservoir, a completely different tunnel construction must be provided for silage compression machines which do not require such a reservoir. Perhaps more importantly, in actual practice it has been shown that only a negligible amount of heat is transferred out of hydraulic fluid contained in a reservoir constructed as shown in U.S. Pat. No. 4,256,031 and into material that is compacted into an agricultural storage bag by the silage compression machine.

The present invention comprises a hydraulic fluid reservoir construction for silage compaction machines which overcomes the foregoing and other difficulties long since associated with the prior art. In accordance with the invention, a self-contained hydraulic fluid reservoir may be mounted adjacent to the tunnel of a silage compression machine, but does not comprise an integral part of the tunnel construction. This permits the use of the same tunnel construction for all types of silage compression machines. Additionally, the reservoir is mounted in a spaced apart relationship with respect to the tunnel wall, thereby facilitating heat transferred from the hydraulic fluid contained in the reservoir to the ambient atmosphere by means of a thermal siphon created by the spatial relationship between the tank and the tunnel wall.

DESCRIPTION OF THE DRAWINGS

A more complete understanding of the invention may be had by reference to the following Detailed Description when taken into conjuntion with the accompanying Drawings, wherein.

DETAILED DESCRIPTION

Figure 1:
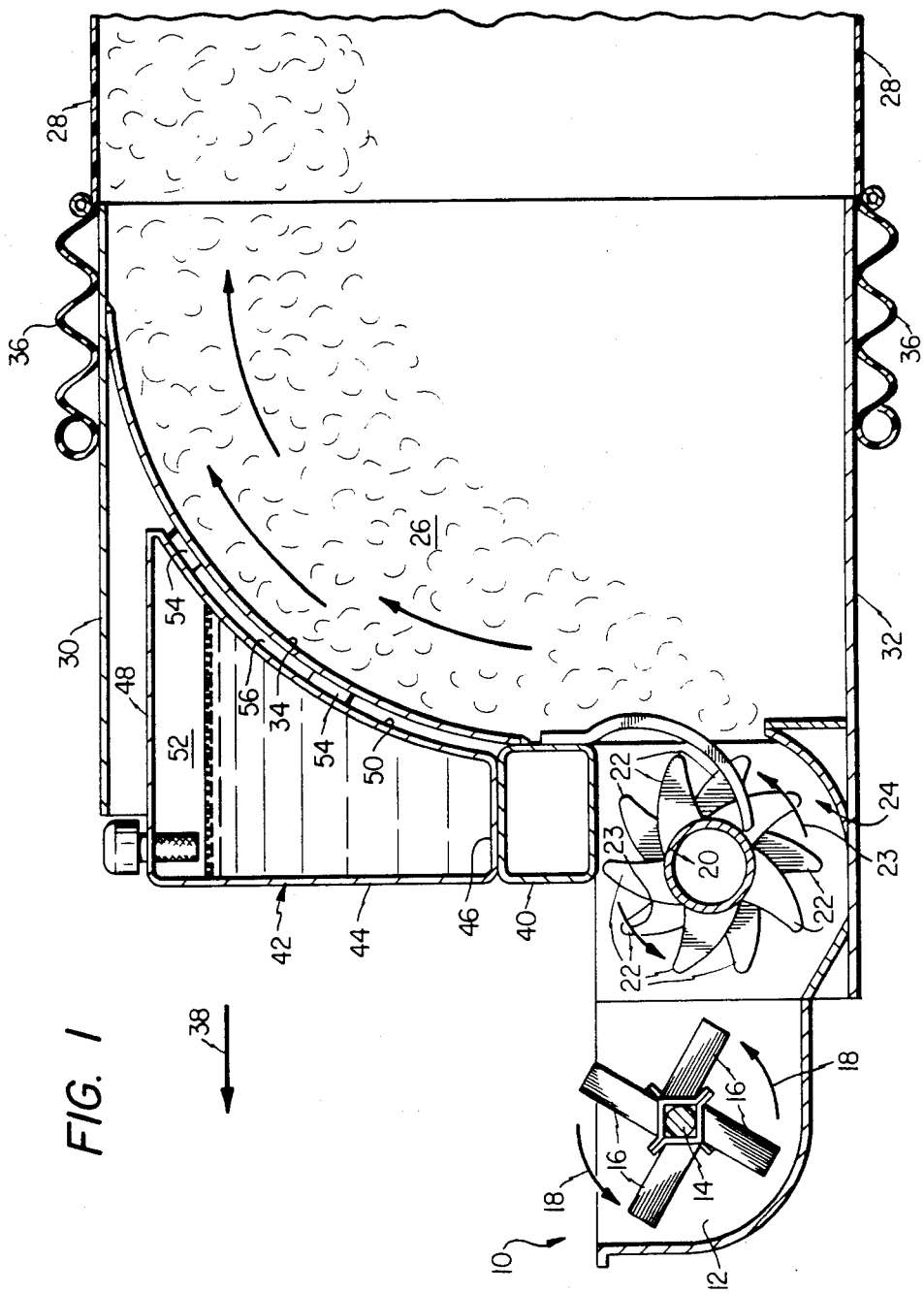
FIG. 1 is a sectional view of a silage compression machine incorporating a hydraulic fluid reservoir construction comprising a first embodiment of the invention.

Referring now to FIG. 1, there is shown a silage compression machine 10 including a hopper 12 adapted to receive silage or other material to be compressed into an agricultural storage bag. A feeder shaft 14 supports a plurality of feeder bars 16 which are rotated in the direction of the arrows 18 to force silage from the hopper 12 toward a primary shaft 20. The primary shaft 20 rotates a plurality of teeth 22 in the direction of the arrows 23 to force the material through a passageway 24 into a tunnel 26. The tunnel 26 directs compressed material from the passageway 24 into an agricultural storage bag 28.

The tunnel 26 comprises a top wall 30, a bottom wall 32, side wall 33 (only one of which is shown) and an arcuate wall 34. The agricultural storage bag 28 is initially carried by the walls comprising the tunnel 26 in the form of a plurality of accordian-type folds 36. In the operation of the silage compression machine 10, compressed material received in the agricultural storage bag 28 remains stationary. The silage compression machine 10 moves forwardly in the direction of the arrow 38, that is, away from the compressed material contained in the agricultural storage bag 28. This causes the portion of the agricultural storage bag which was previously carried by the tunnel 26 to pay out from the rear end of the tunnel in a relatively cylindrical configuration.

The silage compression machine 10 further comprises a main beam 40 extending parallel to and above the primary shaft 20. The arcuate wall 34 of the tunnel 26 curves upwardly and rearwardly from the main beam 40 to the top wall of the tunnel. A hydraulic fluid reservoir incorporating a first embodiment of the present invention is supported on the main beam 40 and extends upwardly and rearwardly therefrom adjacent to the arcuate wall 34.

The hydraulic fluid reservoir 42 comprises a front wall 44, a bottom wall 46 extending rearwardly from the lower end of the front wall 44, a top wall 48 extending rearwardly from the upper end of the front wall 44, a rear wall 50 extending between the rear end of the bottom wall 46 and the rear end of the top wall 48, and a pair of side walls 52 (only one of which is shown)

interconnecting the front, bottom, top and rear walls. Thus, the hydraulic fluid reservoir 42 is entirely self contained, and does not incorporate any component part of the tunnel 26. This is highly advantageous in that the tunnel 26 can be constructed from the same component parts regardless of whether or not the reservoir 42 is utilized in a particular silage compression machine.

The rear wall 50 of the hydraulic fluid reservoir 42 extends adjacent to the arcuate wall 34 of the tunnel 26, but is separated therefrom by spacers 54. This provides a substantial gap 56 extending between the rear wall 50 of the reservoir 42 and the arcuate wall 34 of the tunnel 26. In actual practice it has been found that the transfer of heat from the hydraulic fluid contained within the reservoir 42 is substantially factilitated by means of the gap 56, whereby heat is transferred directly from the fluid in the reservoir to the ambient atmosphere.

Figure 2:
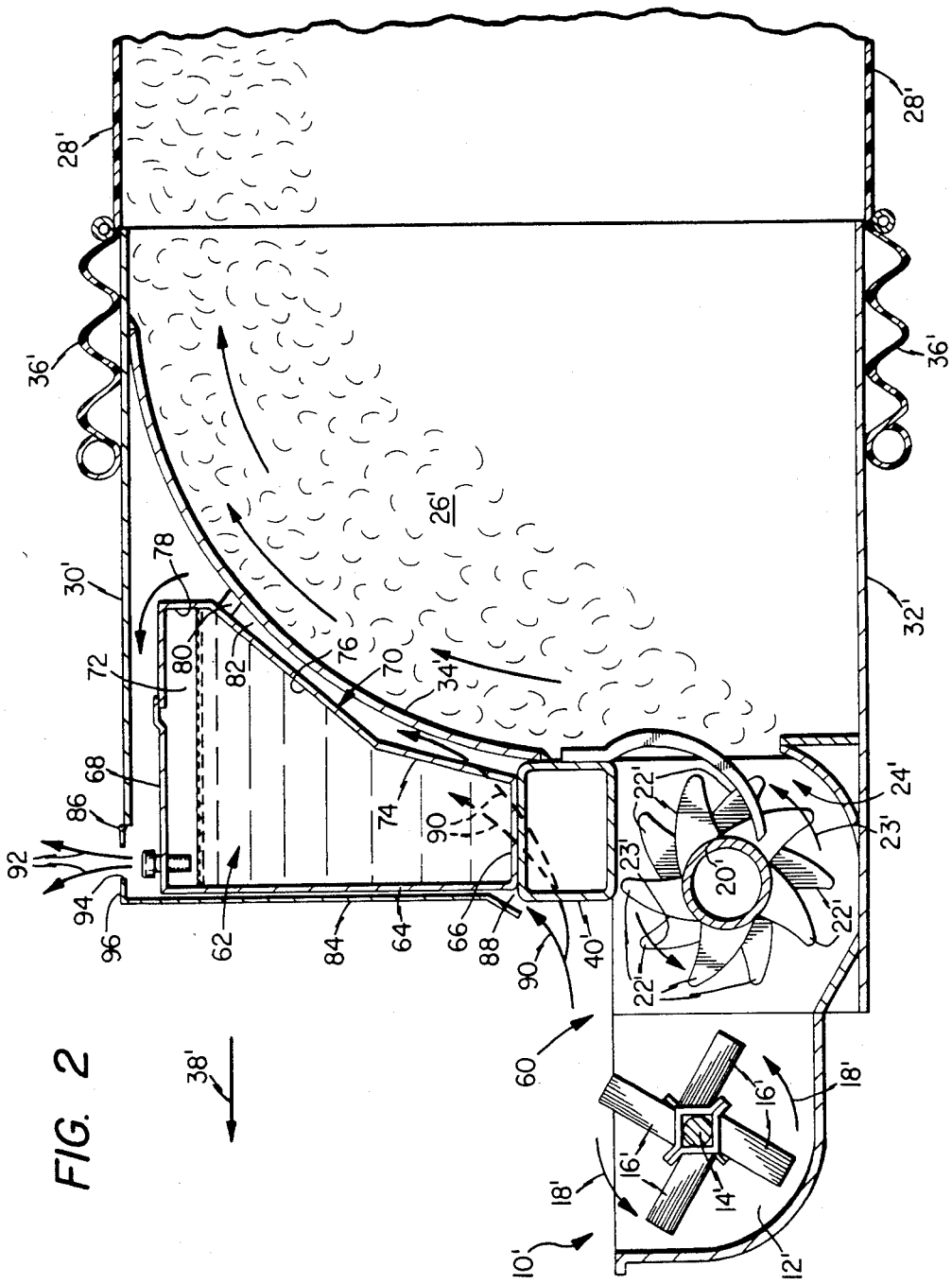
FIG. 2 is a view similar to FIG. 1 illustrating a second embodiment of the invention.

Referring now to FIG. 2, there is shown a silage compression machine 60. The silage compression machine 60 incorporates numerous component parts which are substantially identical in construction and function to component parts of the silage compression machine 10 shown in FIG. 1. Such identical component parts are designated in FIG. 2 with the same reference numerals utilized in the description of the silage compression machine 10, but are differentiated therefrom by means of a prime (') designation.

The silage compression machine 60 utilizes a hydraulic fluid reservoir 62 incorporating a second embodiment of the invention. The hydraulic fluid reservoir 62 comprises a front wall 64, a bottom wall 46 extending rearwardly from the lower end of the front wall 64, a top wall 68 extending rearwardly from the upper end of the front wall 64, a rear wall 70 extending between the rear end of the bottom wall 66 and the rear end of the top wall 68, and a pair of side walls 72 (only one of which is shown) interconnecting the front, bottom, top and rear walls. Thus, the hydraulic fluid reservoir 62 is entirely self-contained, and does not incorporate any component part of the tunnel 26'. This is highly advantageous in that the tunnel 26' can be constructed from the same component parts regardless of whether or not the reservoir 62 is utilized in a particular silage compression machine. The rear wall 70 of the hydraulic fluid reservoir 62 includes a first planar segment 74 extending angularly, upwardly and rearwardly from the rear edge of the bottom wall 66, a second planar segment 76 extending angularly, upwardly and rearwardly from the upper edge of the segment 74, and a third planar segment 78 extending substantially vertically from the upper edge of the segment 76 and connecting with the rear edge of the top wall 68. The use of the three planar segments 74, 76 and 78 in the construction of the rear wall 70 of the hydraulic fluid reservoir 62 results in a rear wall construction which is both stronger and more economical to manufacture when compared with the arcuate rear wall 50 of the hydraulic fluid reservoir 42 shown in FIG. 1.

The rear wall 70 of the hydraulic fluid reservoir 62 extends adjacent to the arcuate wall 34' of the tunnel 26', but is separated therefrom by at least one spacer 80. This provides a substantial gap 82 extending between the rear wall 70 of the reservoir 62 and the arcuate wall 32' of the tunnel 26'. The tunnel 26' is provided with a front wall 84 which may be pivotally connected to the top wall 30' by means of a hinge 36. A gap 88 is provided between the lower end of the front wall 84 and the main beam 40' of the silage compression machine 60.

In the operation of the silage compression machine 60, warm air flows inwardly through the gap 80. As indicated by the arrow 90, air entering through the gap 88 flows upwardly between the front wall 64 of the reservoir 62 in the front wall 84 of the tunnel 26', and also flows adjacent to the end walls 72 of the reservoir 62. Air flow also occurs in the gap 82 between the rear wall 70 of the reservoir 62 and the arcuate wall 34' of the tunnel 26'. Air flowing past the walls comprising the reservoir 62 extracts heat from the hydraulic fluid contained therein, and is thereby heated. As indicated by the arrows 92, heated air flows outwardly through an opening 94 formed in the upper portion 96 of the front wall 84 of the tunnel 26' thereby forming a thermal siphon which rapidly disapates waste heat from the hydraulic fluid contained within the reservoir 62 into the ambient atmosphere. In actual practices it has been found that the transfer of heat from the hydraulic fluid contained within the reservoir 62 is substantially facilitating by means of the thermal siphon comprising the gap 88, the gap 82 and the passageways extending between the front wall 64 of the reservoir 62 and the front wall 84 of the tunnel 26'.

From the foregoing it will be understood that the present invention incorporates numerous improvements over the prior art. First, by means of the invention the use of separate tunnel constructions for silage compression machines requiring a hydraulic fluid reservoir and silage compression machines which do not require such a reservoir is totally eliminated. Another advantage involves the fact that by means of the invention heat is more readily removed from hydraulic fluid contained within the reservoir than is possible with the use of prior art hydraulic fluid reservoir designs.

Although preferred embodiments of the invention have been illustrated in the accompanying Drawing and described in the foregoing Detailed Description it will be understood that the invention is not limited to the embodiment disclosed, but is capable of numerous rearrangements, modifications, and substitutions of parts and elements without departing from the spirit of the invention.

I claim:

1. For use in a silage compression machine of the type having a transversely extending main beam, and a primary shaft positioned beneath the main beam for rotating a plurality of teeth to force material through a passageway and into a tunnel including an arcuate wall extending upwardly and rearwardly from the main beam, a hydraulic reservoir comprising:
    a bottom wall supported on the main beam;
    a front wall extending substantially vertically upwardly from the front edge of the bottom wall;
    a top wall extending substantially horizontally rearwardly from the upper edge of the front wall;
    a rear wall extending upwardly and rearwardly from the rear edge of the bottom wall to the rear edge of the top wall and adjacent to the arcuate wall of the tunnel;
    a pair of end walls secured to the edges of the bottom front, top and rear walls to define an enclosed hydraulic fluid reservoir; and
    spacer means for maintaining the rear wall of the reservoir in a substantially spaced apart relationship with respect to the arcuate wall of the tunnel.

* * * * *